United States Patent [19]

Levine et al.

[11] 4,011,004
[45] Mar. 8, 1977

[54] PIVOTABLE STAGE FOR MICROSCOPE SYSTEM

[75] Inventors: Marshall S. Levine, Wayne, Pa.; Ralph Z. Jorden, Pennsauken, N.J.

[73] Assignee: Geometric Data Corporation, Wayne, Pa.

[22] Filed: Feb. 6, 1975

[21] Appl. No.: 547,685

[52] U.S. Cl. ................................................ 350/90
[51] Int. Cl.² ....................................... G02B 21/24
[58] Field of Search ................... 350/90, 86, 87, 89, 350/95

[56] References Cited

UNITED STATES PATENTS

| | | | |
|---|---|---|---|
| 1,999,240 | 4/1935 | Kraft et al. | 350/89 |
| 2,427,256 | 9/1947 | Butscher | 350/87 |
| 2,474,163 | 6/1949 | Riley | 350/90 |
| 2,825,261 | 3/1958 | Jones | 350/95 |
| 3,738,730 | 6/1973 | Binnings et al. | 350/90 |
| 3,765,745 | 10/1973 | Burboeck | 350/90 |

*Primary Examiner*—John K. Corbin
*Assistant Examiner*—Jon W. Henry
*Attorney, Agent, or Firm*—Caesar, Rivise, Bernstein & Cohen, Ltd.

[57] ABSTRACT

A stage for holding a slide under a microscope in a microscope system is disclosed. The stage includes a movable support member, a slide holder for engaging a slide secured to the movable member. The slide holder is movable with the support member so that a slide held thereby is movable with respect to the optical axis of the system. A condenser disposed in the optical axis of the system is provided. The slide is held and supported by the slide holder and is slidably supported by the condenser so that the plane of the slide in the optical axis of the microscope system remains substantially fixed longitudinally of the optical axis as the slide is moved transversely with respect thereto.

1 Claim, 7 Drawing Figures

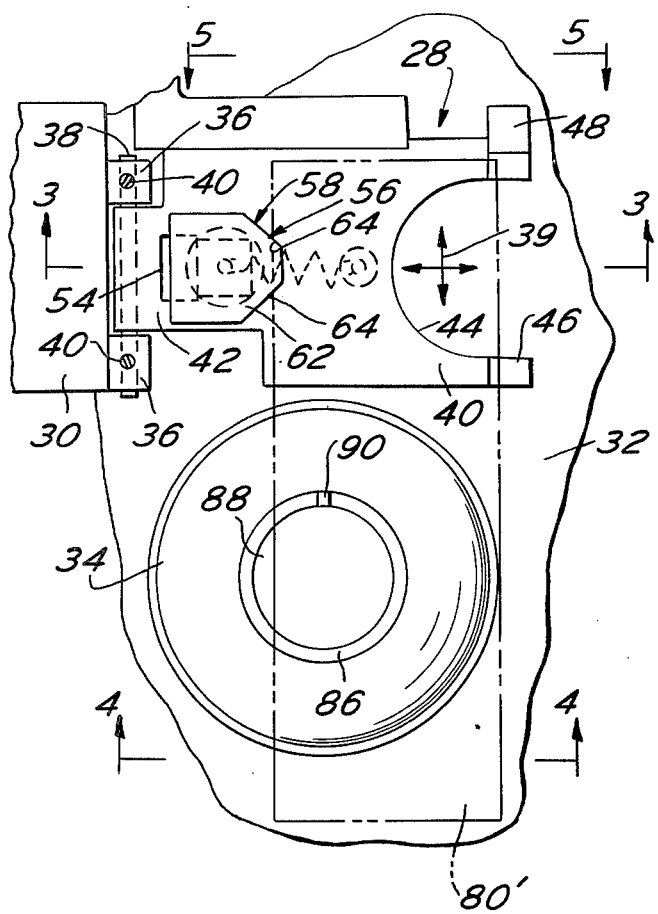

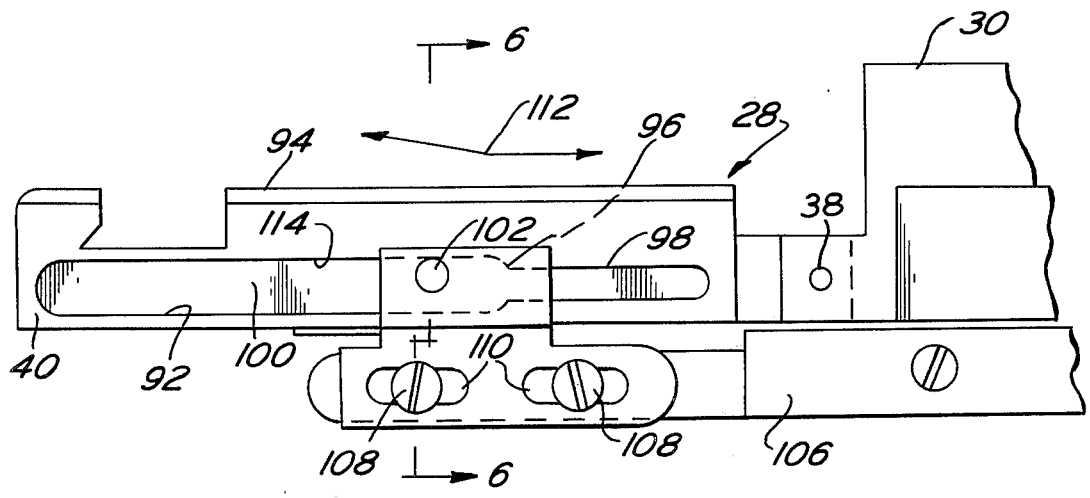
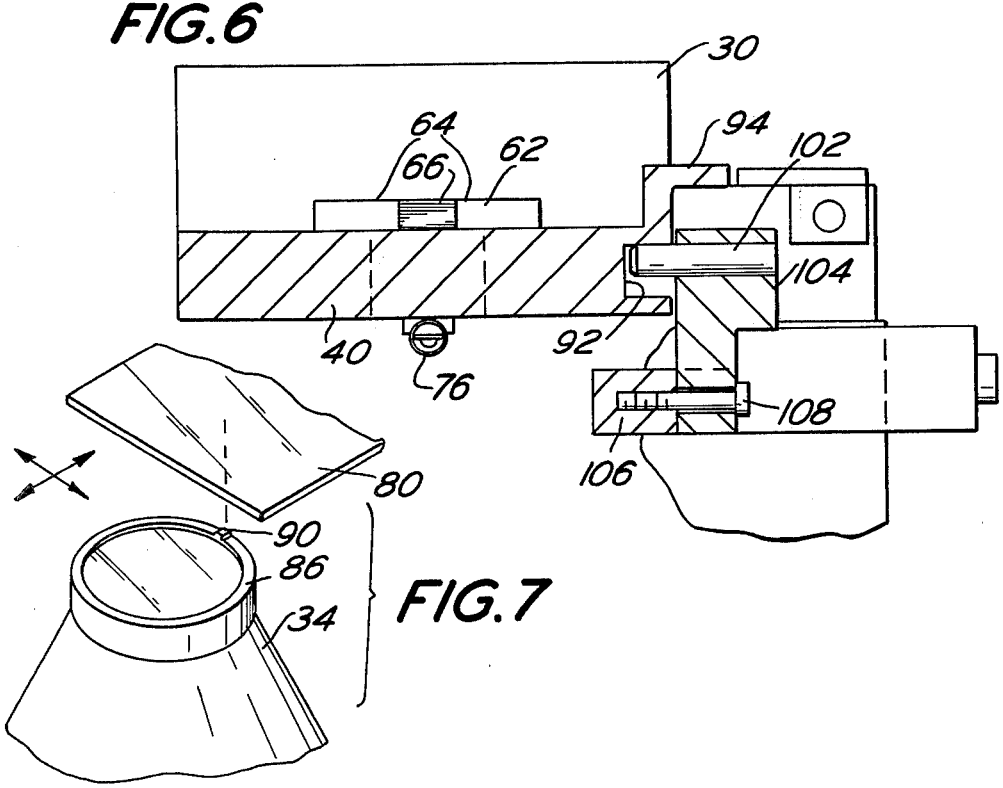

PIVOTABLE STAGE FOR MICROSCOPE SYSTEM

This invention relates generally to stages for microscope systems and more particularly to a pivotable stage for a microscope system which is used in automatic analysis of blood smears on a slide.

A problem of considerable magnitude in the automatic analysis of blood cells in a blood smear is the fact that slides which are used for making a blood smear are not substantially uniform. That is, slides often are not as flat as is desirable for automatic blood cell analysis.

The aforementioned problem can be considerable, as for example when a blood smear is used in a microscope system which is part of an automatic blood cell differential counter, one hundred or more white blood cells are examined on a slide. Because slides are not as flat as is desirable, each time the slide is moved transversely with respect to the optical axis of the system, the plane of the slide varies longitudinally with respect to the optical axis of the microscope system and thereby causes a need for refocusing of the microscope. A slide that looks flat to the naked eye can often cause a variance of more than forty microns in the focal plane of a microscope system. Conventional slide holders merely support the slide on a movable stage which moves transversely with respect to the optical axis of the microscope system. The stages of the conventional microscope systems are normally flat and the slide is slidably supported on the top surface of the stage. Thus, as the slide is moved transversely with respect to the optical axis, any bend in the slide causes a change of the plane of the slide longitudinally along the optical axis of the microscope system.

It is therefore an object of this invention to overcome the disadvantages of the prior art.

Another object of the invention is to provide a new and improved state for a microscope system which flattens the plane of the slide as it moves transversely to the optical axis of a microscope system.

Yet another object of the invention is to provide a new and improved stage which pivotably supports a slide so that the point at which the slide is held is movable longitudinally of the optical axis to enable the portion of the slide along the optical axis to remain in a fixed plane with respect thereto.

Still another object of the invention is to provide a new and improved stage for holding a slide which facilitates securement of the slide in the holder and removal of the slide from the holder.

Yet another object of the invention is to provide a new and improved stage for holding a slide in an examination area which comprises a movable support member, a slide holder for engaging a slide and a fixed member adjacent the examination member. The slide holder is movable with the support member and the slide is held and supported by the slide holder and slidably supported by the fixed member so that the level of the plane of the top surface of the slide remains substantially unchanged in the examination area.

These and other objects of the invention are achieved by providing in a microscope system a stage for holding a slide under a microscope. The stage includes a movable support member. A slide holder is provided for engaging the slide secured to the movable member. The slide holder is movable with the support member so that a slide held thereby is movable with respect to the optical axis of the system. A condenser is provided which is disposed in the optical axis of the system. The slide is held and supported by the support member and is slidably supported by the condenser on an upwardly extending projection thereon so that the plane of the slide in the optical axis of the microscope system remains substantially fixed longitudinally of the optical axis as the slide is moved transversely with respect thereto.

Other objects and many of the attendant advantages of this invention will be readily appreciated as the same becomes better understood by reference to the following detailed description when considered in connection with the accompanying drawings wherein:

FIG. 2 is a top plan view of the pivotable stage embodying the invention;

FIG. 3 is an enlarged sectional view taken along the line 3—3 in FIG. 2;

FIG. 4 is an enlarged side elevational view taken along the line 4—4 in FIG. 2;

FIG. 5 is an enlarged side elevational view taken along the line 5—5 in FIG. 2;

FIG. 6 is an enlarged sectional view taken along the line 6—6 in FIG. 5; and

FIG. 7 is an exploded perspective view of a slide adjacent a condenser used in the microscope system.

Referring now in greater detail to the various figures of the drawing wherein like reference numerals refer to like parts, a microscope system is shown generally at 20 in FIG. 1.

Figure 1:
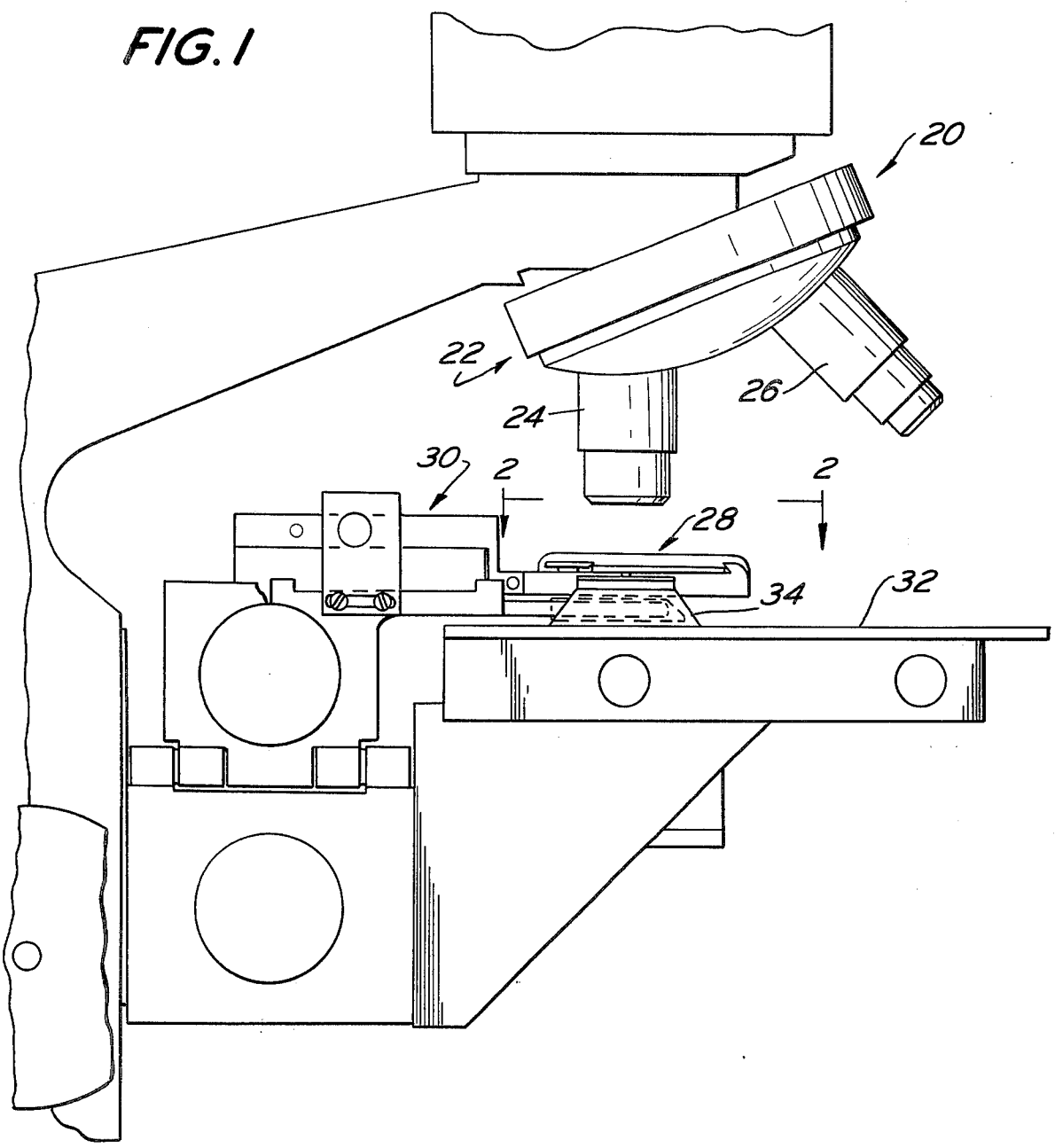
FIG. 1 is a side elevational view of a microscope system embodying the invention.

The microscope system includes a lens turret assembly 22 including a plurality of microscope lens assemblies 24 and 26 of varying magnifications for the purpose of changing the magnification of the microscope. Provided directly below the microscope lens assembly 24 which is provided in the optical axis of the system is a movable stage 28 embodying the invention.

Stage 28 is pivotably secured to a movable support 30 which is conventionally translatable in order to enable movement of the stage transversely with respect to the optical axis along rectilinear coordinates.

Mounted directly below the microscope lens assembly 24 and supported by a table 32 is a condenser 34 which is fixedly mounted with respect to the table 32.

Referring to FIG. 2, it can be seen that the movable support 30 includes a pair of laterally extending projections 36 which each include an opening which is aligned with the opening in the other of the projections to form a bracket for pivotably supporting stage 28 about pin 38 which extends through projections 36.

As will hereinafter be seen in greater detail, a slide which is shown in phantom in FIG. 2 is held at one end within the stage 28 and supported by both the stage 28 and the condenser 34. The movable support 30 includes conventional step motors to enable automatic movement of the movable support along rectilinear coordinates transverse to the optical axis of the microscope system. The direction of movement of the movable support member 30 is indicated by arrows 39 in FIG. 2.

The optical axis of the microscope extends through the center of condenser 34 as shown in FIG. 2 to provide an examination area of the slide in the area directly above the condenser 34. Thus, the slide is moved by the movable support member 30 transversely to the optical axis of the microscope system, yet the plane of the slide in the examination area remains substantially flat longitudinally along the optical axis because of the fact that the bottom surface of the slide rides along the top surface of the condenser 34.

Therefore, the portion of the slide examined along the optical axis remains in a substantially flat plane. That is, a plane fixed longitudinally along the optical axis. The plane is substantially flat because there is little variance of the thickness of the glass slide.

Stage 28 basically comprises a generally rectangular plate 40 which includes a narrow portion 42 which includes a laterally extending opening through which pin 38 extends. Pin 38 is suitably secured in the projection 36 by a pair of fasteners 40, one of which is secured in each of the projections through an opening which extends transversely to the longitudinally extending opening which receives pin 38. The plate 40 of stage 28 thus pivots about an axis through pin 38.

The plate 40 also includes a semi-circular opening or notch 44 on one side of the plate 40. Provided on diametrically opposed sides of the notch 44 are a pair of projections 46 and 48. As best seen in FIGS. 3 and 4, projections 46 and 48 extend upwardly from the plane of plate 40 and each include a triangularly shaped notch 50 which is provided by an inclined surface 52. The height of the notches 50 in flanges 46 and 48 is greater than the thickness of a slide.

The plate 40 of stage 28 further includes a rectangular opening 54 within which a slide retaining assembly 56 is assembled. The slide retaining assembly 56 basically comprises a slide member 58 which includes a generally rectangular portion 60 which is integrally secured to a planar portion 62. The planar portion 62 is larger than opening 54 of the stage plate 40 so that the planar portion rides on the top surface of the plate 40. The rectangular portion 60 extends through opening 54 and, as can best be seen in FIG. 3, the rectangular portion 60 is not as long as the length of opening 54 so that the slidable member 58 is enabled to slide along the length of opening 50 in a direction transverse to the longitudinal axis of a slide supported by stage 28.

As best seen in FIG. 2, the planar portion 62 of the slidable member 58 is generally rectangular and includes a pair of beveled surfaces 64 which act to provide a narrow front portion terminating at edge 66. As best seen in FIG. 3, edge 66 is beveled at surface 68 to provide an inclined surface at the front edge 66 of the slidable member 58 which extends below the top surface thereof.

Secured to the rectangular portion 60 of the slidable member 58 is a plate 70 which is secured to the rectangular portion 60 by a threaded fastener 72. The threaded fastener extends through an opening in plate 70 and is threadedly secured in a threaded opening in the rectangular portion 60 of the slidable member 58. Threaded fastener 72 includes an enlarged head 74 above which is looped an end of a coil spring 76.

The other end of spring 76 is looped around the shank of threaded fastener 72 which includes an enlarged head 78. The fastener 72 is threadedly secured to plate 40 spaced from the closest end of opening 54 in plate 40. The spring 76 acts to resiliently urge the slidable member 58 against the forwardmost wall of opening 54 in the plate 40 when no slide is in the stage and towards projections 46 and 48.

As best seen in FIG. 3, the slide retaining assembly 56 acts to retain a slide 80 which is shown engaged between projection 48 and the front edge 66 of the slide retaining assembly 56. The arrows 82 in FIG. 3 indicate that the slide retaining assembly 56 moves back and forth in the direction of arrows 82 to enable the end of a slide 80 to be held at its lateral edges by spring tension to the stage 28. It should also be noted that the slide 80 is also retained against vertical movement with respect to the top surface of plate 40 by the inclined surfaces 52 and 68 of the projections and slide member 58, respectively, which overlap the top surface of the slide.

As best seen in FIG. 2, the slide 80 which is shown in phantom at 80' is held in place between the two projections 46 and 48 and the slide retaining assembly 56. The slidable member 58 is urged towards the rear of opening 54 by the rear lateral edge of the slide when it is placed in the stage. The forwardmost lateral edge of the slide is then placed against the top surface of the plate 40 and the spring urging of the slide retaining assembly draws the slide 80 forward against the projections 46 and 48. The inclined surfaces of projections 46, 48 and front edge 56 of slide 58 prevent the disengagement of the slide 80 when the slide is resting on condenser 34.

As best seen in FIG. 4, the condenser 34 is mounted directly below the microscope lens assembly 24 along the optical axis 84. The condenser 34 includes a metal ring 86 which is preferably made of an aluminum alloy, the upper surface of which includes a Martin Hardcoat finish, and which surrounds the uppermost lens 88 of the condenser. Ring 86 includes an upwardly extending projection 90 which, as best seen in FIG. 4, has a rounded uppermost surface. The slide is thus held by the stage 40 between the slide retaining assembly 56 and projections 46 and 48 and supported by the projection 90 on ring 86 of the condenser 34.

The projection 90 is disposed adjacent the optical axis of the microscope system and thus the bottom surface of the slide is always at a fixed level or in a fixed plane adjacent the optical axis. That is, the stage 28 which holds slide 80 is pivotable about pin 38 and the weight of the stage causes the bottommost surface of slide 80 to rest on projection 90 as best seen in FIGS. 4 and 7.

Thus, the bottommost surface of slide 80, since it is slidable on the top surface of the projection 90, remains in a fixed plane at the top surface of projection 90 as the slide is moved transversely to the optical axis by the movable support member 30. Since projection 90 is closely adjacent the optical axis of the microscope system, the plane of slide 80 remains substantially fixed along the longitudinal extent of the optical axis of the system. Any deviation is small because the distance between the projection 90 and the optical axis is small. Also, though a slide may be bent longitudinally along the extent thereof, the thickness of a glass slide normally varies a relatively small amount along the length thereof.

As best seen in FIGS. 5 and 6, plate 40 of the stage 28 includes an elongated recess 92 which is provided in a lateral edge and extends from the front to the rear of the side of the plate 40. At the uppermost edge of plate 40, above recess 92 and provided along the lateral edge, is an L-shaped flange 94. The slotted recess 92, as it proceeds towards the rear end of the stage 40, becomes reduced at shoulder 96 to form a reduced portion 98. Thus, recess 92 includes a narrow portion 98 and a wide portion 100.

A pin 102 interacts with the recess 92 in order to facilitate insertion and removal of the slide into the stage 28. That is, pin 102 is mounted in a bracket 104 which is suitably fastened to a fixed standard 106 which is secured to the table of the microscope system and remains in a fixed position with respect to the optical axis of the system. The bracket 104 is secured to the standard by a pair of threaded fasteners 108 which extend through slotted openings 110 and are threadedly secured in the standard 106. The slotted openings 110 in bracket 104 facilitate adjustment of the location of the bracket 104 and thus the location of the pin 102 with respect to the plate 40 of stage 28. The pin 102 is suitably secured in the bracket 104 at one end and the other end projects into recess 92.

As best seen in FIG. 5, as the plate 40 of the stage 28 moves from front to rear or vice versa as indicated by arrows 112, the top surface 114 of recess 92 rides along the top surface of pin 102 and thereby causes the stage 28 to be lifted when the pin 102 reaches the upper shoulder 96 as the stage is moved outwardly. When the stage is moved to the rear, the stage is lowered as the pin moves from the narrow portion 98 of the recess to the wider portion 100 of the recess. The pin and recess interact to support the stage when a slide is not provided in the stage. That is, when a slide is secured between the front face 66 of the slide retaining assembly 56 and the projections 46 and 48, the slide and stage are supported by the projection 90 of the condenser. This maintains the stage 28 at the level of the top surface of the condenser. When a slide is not held within the stage, the stage would fall but for the fact that the pin 102 abuts the top surface of the recess 92.

To help prevent the slide from contacting the projection too abruptly, the stage is placed in the outermost position when the slide is placed in the stage. Thus, the pin 102 is in the narrow section 98 of the recess and thereby elevates the stage to a position that the stage holds the slide above the projection 90. When the slide is positioned in the optical axis of the microscope, the stage is moved rearwardly which lowers stage 28 as the pin 102 is aligned with the wider portion 100 of recess 92. Slide 80 is thus lowered onto the projection 90 of the condenser 34. The wider portion 100 of the recess is therefore disposed in relation to stage 28 so that the pin resides in the portion 100 of recess 92 when the slide is in the examination area of the microscope system.

The top surface area of the projection 90 is very small in comparison to the length of the slide so that the slide can "bend" around the projection as it is moved. The projection 90 is preferably 0.09 inch (2.29 mm) lone in the radial direction of ring 86 and 0.032 inch (6.81 mm) wide along the perimeter of ring 86. The height of projection 90 is preferably 0.006 inch (0.15 mm). Therefore, projection 90 acts as a point-like fixed support adjacent the optical axis of the system.

It can therefore be seen that a new and improved stage has been provided. The construction of the stage facilitates the insertion and removal of a slide into the stage. That is, the stage includes the slide retaining assembly which includes a slidable member 58 which is urged rearwardly as a slide is inserted. The slide is lowered at its forwardmost edge beneath projections 46 and 48 and the spring then quickly secures the slide between the front surface 66 of the slidable member 58 and the projections 46 and 48. The notch 44 facilitates insertion of the end of the slide between the slide retaining assembly and the projections by providing room for the fingers of the operator.

In addition, the pin 102 and recess 92 interact to facilitate the insertion and removal of the slide as well as to prevent damage to the slide as it abuts the projection 90 on the ring surrounding the uppermost end of the condenser.

Finally, the provision of the projection 90 adjacent the optical axis of the microscope system upon which the slide rides fixes the plane of the slide at a point closely adjacent the optical axis of the system and thereby acts to flatten the plane of the slide as it passes transversely with respect to the optical axis during examination.

Without further elaboration, the foregoing will so fully illustrate our invention that others may, by applying current or future knowledge, readily adapt the same for use under various conditions of service.

What is claimed as the invention is:

1. In a microscope system, a stage for holding a slide under a microscope, said stage including a movable support member, a slide holder for engaging a slide, said slide holder secured to said movable support member by a pivotable member which is rotatable about a horizontal axis, means for moving said movable member in at least two rectilinear directions, said slide holder being movable with said movable support member so that a slide held thereby is movable in two rectilinear directions in a plane substantially transverse to the optical axis of said system, a condenser disposed in the optical axis of said system, said condenser including a point-like projection which extends upwardly from the top of the condenser, said slide holder including a slidable member and fixed projection, means on said slide holder for resiliently urging said slidable member against said slide so that said slide is held by said slide holder between said slidable member and said projection, said slide holder and slide being disposed with respect to said condenser so that said slide rests on said point-like projection and is slidably supported thereon so that the bottom surface of said slide in the optical axis of said microscope system remains substantially fixed longitudinally of said optical axis as said slide is moved transversely with respect thereto.

* * * * *